United States Patent [19]

Huschka et al.

[11] Patent Number: 5,109,918
[45] Date of Patent: May 5, 1992

[54] DEVICE FOR THE THERMAL TREATMENT OR ORGANIC AND INORGANIC SUBSTANCES

[75] Inventors: Hans Huschka, Hanau; Joerg Demmich, Wuerzburg; Paul-Gerhard Maurer, Neuberg, all of Fed. Rep. of Germany

[73] Assignee: Nukem GmbH, Alzenau, Fed. Rep. of Germany

[21] Appl. No.: 534,498

[22] Filed: Jun. 8, 1990

[30] Foreign Application Priority Data

Jun. 8, 1989 [DE] Fed. Rep. of Germany ....... 3918718

[51] Int. Cl.⁵ ............................................... F28D 15/00
[52] U.S. Cl. ................................. 165/104.18; 110/225; 110/229; 165/104.15; 422/229
[58] Field of Search ............... 110/225, 227, 228, 256, 110/238, 229; 165/104.18, 104.15; 422/223, 224, 229; 122/367.4

[56] References Cited

U.S. PATENT DOCUMENTS 2,655,883 10/1953 Martin ................................. 110/225
3,254,881 6/1966 Rusk ........................... 165/104.18 X
4,424,198 1/1984 Ito et al. ......................... 422/229 X
4,732,210 3/1988 Michalak et al. .............. 165/104.18

FOREIGN PATENT DOCUMENTS 646182 6/1937 Fed. Rep. of Germany .
3205569 9/1983 Fed. Rep. of Germany .
3028193 11/1984 Fed. Rep. of Germany .

OTHER PUBLICATIONS

K. J. Thome-Kozmiensky, EF-Verlag fuer Energie- und Umwelttechnik GmbH, Berlin, Jun. 1985, pp. 381-391.

*Primary Examiner*—Edward G. Favors
*Attorney, Agent, or Firm*—Beveridge, DeGrandi & Weilacher

[57] ABSTRACT

A device for the thermal treatment of organic substances and of inorganic substances contaminated with organic substances which makes a high throughput possible. The reactor contains several bottoms provided with perforations with ceramic ball sections which can be moved separately.

4 Claims, 3 Drawing Sheets

DEVICE FOR THE THERMAL TREATMENT OR ORGANIC AND INORGANIC SUBSTANCES

INTRODUCTION AND BACKGROUND

The present invention relates to a device for the thermal treatment of solid and sludge-like organic substances and of inorganic substances contaminated with organic substances. More particularly, the present invention relates to an upright cylindrical reactor which is filled with ceramic or metal balls and is provided with an agitator for moving the balls in a radial and an axial direction.

Reactors with fixed or movable ball charges and also multistage furnaces or disk dryers are known for the thermal treatment of organic and inorganic substances in upright cylindrical furnaces.

Thus, DE-OS 30 28 193 describes a device for the treatment of organic substances in which largely spherical ceramic structures are moved by an agitator in such a manner that they do not agglomerate, cake, or stick together due to the separated decomposition products. However, in furnaces of rather large diameter, only relatively small amounts of substances can be processed in that manner on the order of 1 kg/h since problems occur in the transmission of heat. In the case of a furnace having a diameter of more that 15 cm, the integral thermal conductivity of the filler charge is generally no longer sufficient to prevent undecomposed charge products from breaking through in the middle of the furnace.

DE-PS 6 46 182 teaches moving bituminous fuels in a heated, upright, cylindrical reactor in an axial direction in order to subject them to a low-temperature carbonization, whereby the fuels are transported upward via a worm in the center of the reactor from below and sink down from above on the wall of the reactor. However, this device is not suitable for the thermal decomposition and conversion of organic and inorganic substances since the filler bed can easily agglomerate.

DE-P 32 05 569 describes a device for the thermal decomposition and conversion of organic and inorganic substances which is composed of a heated, upright, cylindrical reactor with ceramic fillers and an agitator, consisting of agitator shaft, carrier arms and one or more helices.

Disadvantages of all these devices are the insufficient heat supply during indirect heating via the wall, a very high charge weight in the case of rather large bulk heights and a churning or mixing of the charge which is insufficient in the case of rather large charge heights, that is, in the case of an unfavorable ratio between charge height and reactor diameter.

Multistage furnaces are described in K. J. Thome-Kozmiensky, EF-Yerlag fuer Energie- und Umwelt-technik GmbH, [EF Publishing House for Energetic and Environmental Technology] Berlin 1985, pp. 381-391 which are also called disk furnaces or disk driers, depending on the area of application. The furnaces consist of a housing which exhibits an essentially cylindrical form and is arranged in a standing position with disks arranged in stages over each other in the interior. The material is moved over the disks by means of rabble or raking arms and with a centrally arranged, upright drive shaft. A direct drying process combined with a combustion process takes place in this furnace. The fuel, such as thick sludge, filter cake, filter briquette or waste sewage sludge mixture is placed on the uppermost hearth or disk. During the entire process, the material is turned by the agitator teeth of the rabble arms and transported further. As a result the material falls from level to level through shafts arranged in alternating fashion on the inside or the outside. The constant motion produces the exchange surface between the material and the air-gas current necessary for the reaction by spreading it out on the hearth surfaces.

Disadvantages in these devices are the large number of individual levels or stages and therewith the necessary great over-all height of the furnace in order to achieve the necessary minimum dwell time in the furnace for the substance to be treated as well as the non-defined movement of material on the individual levels, which results in agglomerations and therewith to a low material surface, which should be as large as possible in drying and combustion processes. In addition, an undesirable large dwell time spectrum of the substance to be treated results as a consequence of the disordered movement of charge material.

SUMMARY OF THE INVENTION

An object of thee present invention is to provide a device for the thermal treatment of solid and sludge-like organic substances and of inorganic substances contaminated with organic substances comprising an upright cylindrical reactor which is filled with ceramic or metal balls, an agitator fitted in the reactor for moving the balls in a radial and in an axial direction and which makes possible a high throughput with a defined movement of reaction material.

In achieving the above as well as other objects, one feature of the reactor of this invention resides in the fact that the balls are distributed over several levels or tiers arranged at intervals above each other to provide a multistage reactor. Each of the tiers or shelves have at least one perforation formed therein which is permeable to gases and fine solid particles and permits the passage from one stage to another.

The ratio between charge height of the balls and reactor diameter at each shelf is preferably between 0.1 and 2. Furthermore, it is advantageous if the agitator shaft is subdivided once or several times and if each agitator section is separately driven. It is also advantageous if the agitator shaft is designed to be hollow so that gaseous reactants and reaction products can be fed to and removed from the individual ball charges via the agitator shaft. A design of the reactor bottom for an indirect heating of the reaction material is likewise advantageous.

BRIEF DESCRIPTION OF THE DRAWINGS

The present invention will be further understood with reference to FIGS. 1-3 the drawing which shows schematic representations of the device of the invention.

DETAILED DESCRIPTION OF THE INVENTION

Figure 1:
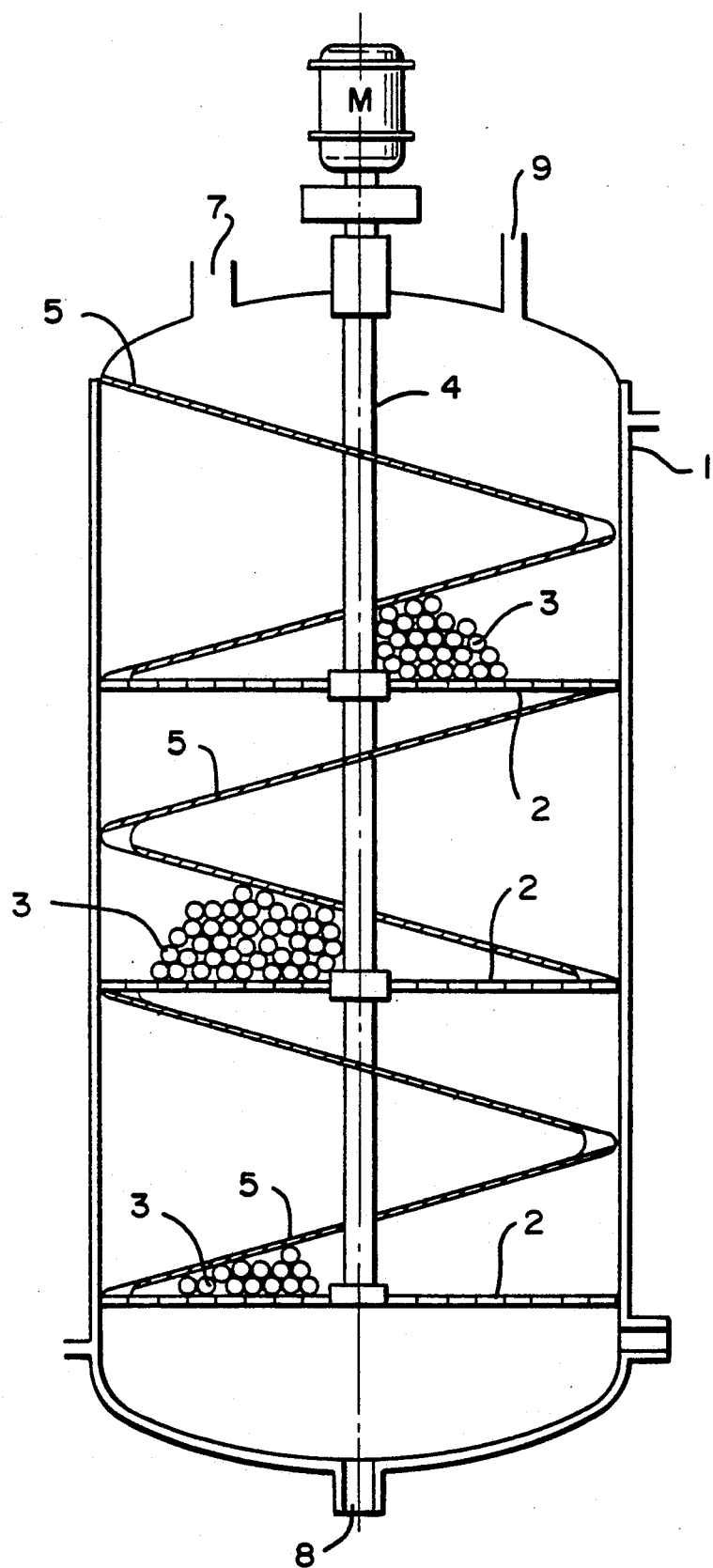
Figure 2:
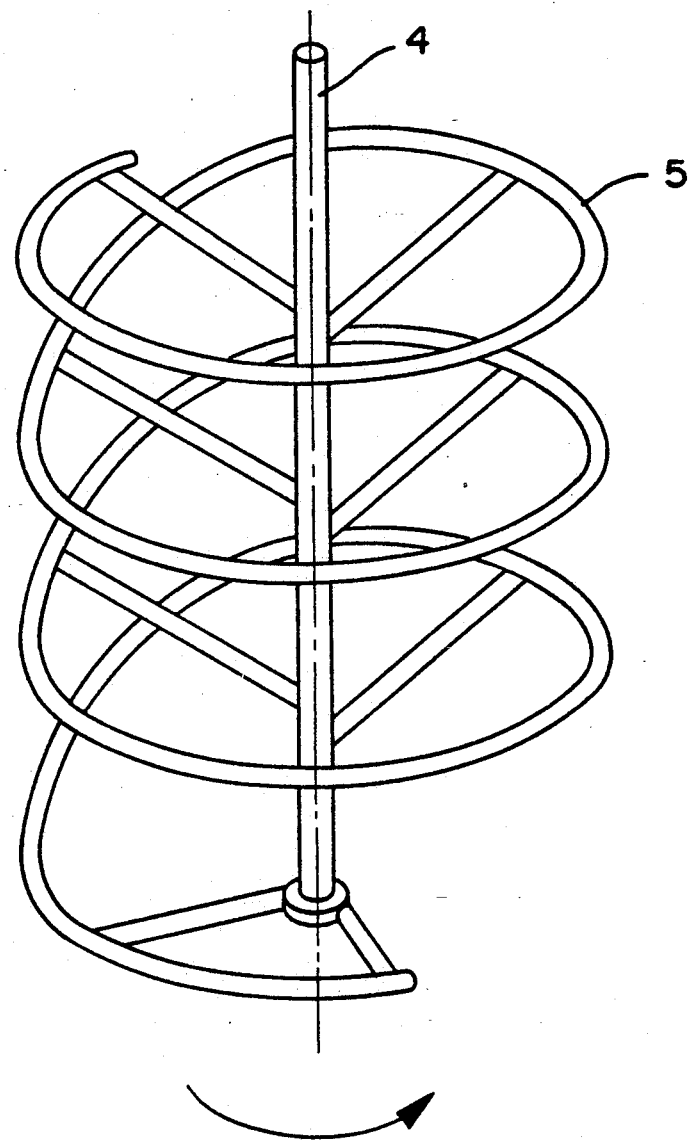

An exemplary embodiment of the device of the invention is shown in the drawing in schematic fashion in longitudinal section. The reactor 1 comprises three plates or shelves 2 provided with perforations and positioned at intervals above each other. Loaded on each plate is the ball charge for a total of three ball charges 3 in the embodiment. An agitator shaft 4 is centrally mounted on which agitator helices 5 are located. The reactor is heated via a burner. The charging of the substance to be treated takes place from above via a port 7. The ash or the solid reaction product is removed at the reactor bottom also via a port 8. The gaseous products escape via guide system 9 at the head of reactor 1. Plates or shelves 2 have a plurality of perforations with circle diameters of 1/10 to 2 ½ inches.

The balls are moved upward on the reactor wall in an ordered loop motion and downward via the force of gravity in the reactor middle by means of a purposeful agitating of the individual ball charge sections with a continuous or sectioned agitator (e.g. helical or spiral agitators with individual helical sections). The substance which is to be treated and is added above the first ball charge as well as the gaseous drying products, reaction products and combustion products being produced move with a narrow range of dwell time through the agitated ball charges, whereby particle agglomerations are prevented by the grinding action of the balls. The consequence is the constant formation of a large surface area for the charged material, of a constantly new surface and therewith a diminution of the necessary dwell time of the substance in the furnace. The reactivity of the substance to be treated is heightened by means of tribochemical activation. Furthermore, problems of encrustation and agglomeration on the balls, the agitator and the reactor wall are avoided by the continuous motion of the balls. In order to obtain a purposeful motion of the particular ball charge, a charge height with a ratio of charge height and reactor diameter of between 0.1 and 2.0 should be selected. Normally, inert ceramic balls are used for the charges. These materials are known in the art.

If the individual reactor plates, which are designed as sieve grates or ring grates with a set free cross section, and the cylindrical reactor wall are designed to be double, that is, with a hollow space, then the individual charges can be heated indirectly with flue gas. As a result thereof, these reactors can be used for the pyrolytic decomposition and/or indirect drying of sludges, especially sewage sludge. The additional heating of the reactor bottoms means that considerably greater amounts of heat can be brought into the system and the through-puts of the substances to be treated can be increased. A radial temperature gradient is also reduced by means of this measure.

The device of the invention can also be used for the combustion and/or direct drying of sludges, especially sewage sludge. To this end, e.g. combustion air and/or drying gas can be fed into the reactor from below in countercurrent flow to the substance to be treated, which is then added at the top of the reaction vessel.

The division of the reactor into several ball charges makes it possible to adjust the method parameters in a purposeful manner in each individual charge which are necessary for a certain method step in the entire conversion. It is possible in this manner, for example, to carry out drying, pyrolysis and oxidation adjacent to each other in the individual charges.

There is also the possibility of introducing in particular gaseous reactants through the agitator shaft into the individual ball charges. It is possible in this manner, for example, to burn out the residual carbon in another charge after a pyrolysis step carried out with the exclusion of oxygen by feeding in air or oxygen mixtures or to treat ashes in an oxidizing manner. Gaseous reaction products can of course also be drawn off via the agitator shaft.

A further advantage in the area of design but also of engineering which is offered is to subdivide the agitator shaft, perhaps mount it in an intermediary bottom in addition and also to drive it separately. This offers the possibility of influencing the dwell times of the solid reactant in the individual ball charge zones by means of different speeds.

If the charge height of the ball bed is low in a ball charge zone, that is, the ratio of charge height to charge diameter is small, then the required heat must be applied more or less completely over the heated bed bottom.

If it should be necessary to introduce rather large heat loads into the reactor in order to increase the throughput, it is advantageous to use metal balls, e.g. fine steel balls. This enables rather large amounts of heat to be distributed in a uniform manner in the reactor.

The reactor of the invention is preferably used for the pyrolysis of sewage sludge. The sewage sludge, which is usually compounded with lime, is fed in from above into the reactor and the drying, pyrolysis and oxidizing treatment of the pyrolysis residues are carried out in the individual charges. This achieves a maximum reduction in volume of the sewage sludges introduced which is associated with a reliable disposal of heavy metals and organic pollutants contained therein.

For the pyrolysis of sewage sludge, the dewatered sewage sludge with a dry substance content of approximately 40-50% by weight is placed with the addition of 10-20% by weight CaO onto the uppermost ball charge and heated in a current of inert gas up to 300°-400° C., whereby the residual drying takes place as well as the release of the first pyrolysis products. The solid travels through the agitated ball bed and the perforated bottom onto the second ball charge, in which the pyrolysis is carried out at 600°-800° C., whereby toxic halogenated hydrocarbon is also decomposed and the halogen bound to CaO. In the third ball charge, all gaseous pyrolysis products and water vapor are liberated from the sewage sludge and the remaining solid is brought into the fourth ball charge, where the residual carbon stemming from the pyrolysis is burned under the admixture of oxygen. In addition, the heavy metal present is completely converted into the oxidic form, which is only slightly soluble.

Figure 3:
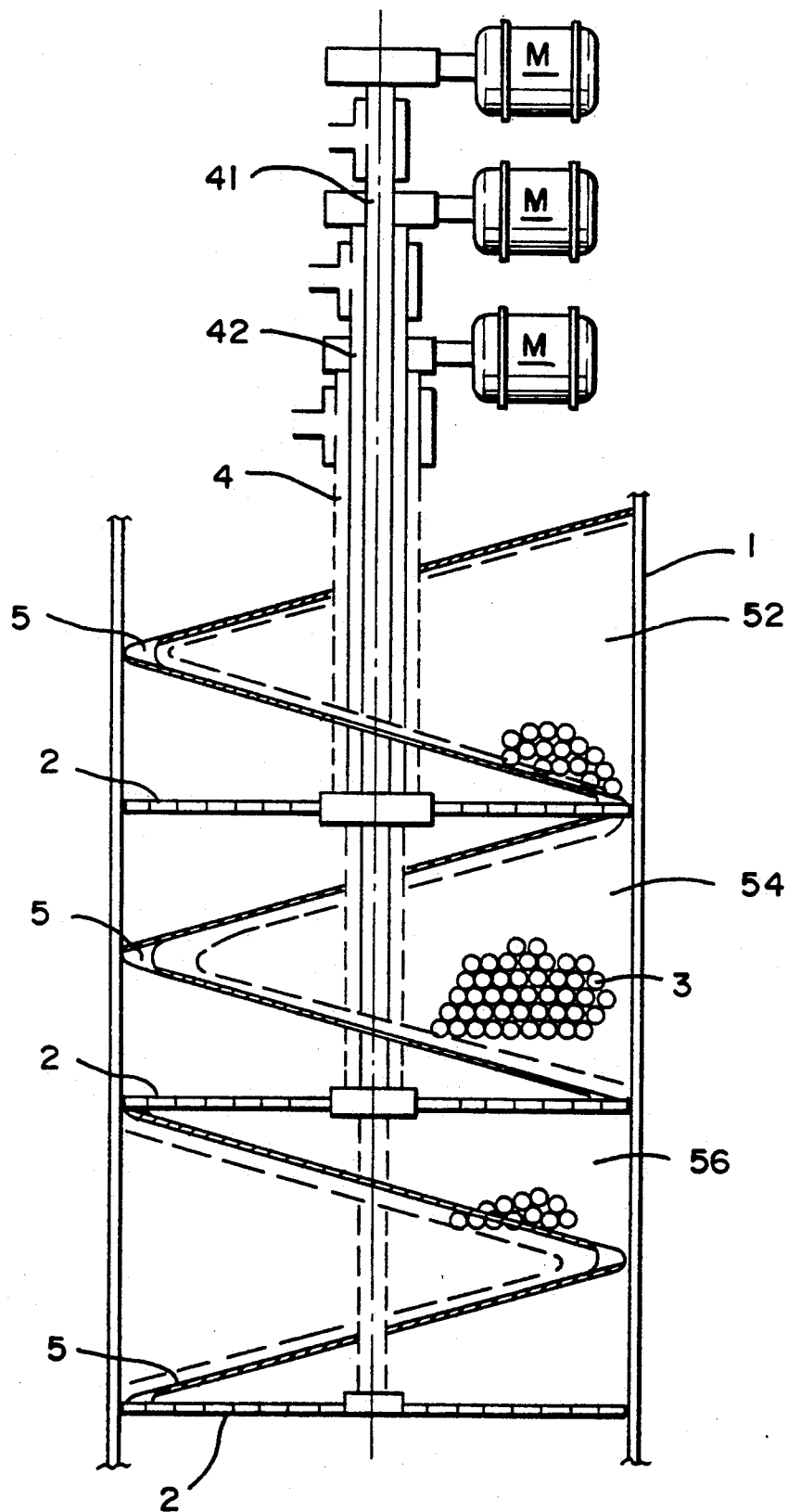

In further more detailed aspects, the number of stages can vary. The height is the effective limit for the stage number. The minimum number is one the maximum number is generally six stages. FIG. 3 shows three stages (52, 54, 56).

The diameter of the reactor is dependent on the height of the reactor. The ratio (height/diameter) must be kept between 0.1 up to 2. Normally the diameter varies between 2 up to 5 feet.

With regard to agitation used herein is 5 rpm. Normally in operation is between 1 up to 2. The agitator is used for initiating a regular material flow and circulation from the bottom to the top of each reactor stage. Dependent on the dimensions of each stage, there can be up to 10 pitch of blades on the helix.

The size of perforations on the plates can vary so long as the size of perforation is less than the diameter of balls. This means generally a range of between 1/10 up to 2 ½ inches. All holes have the same size.

The amount of material that can be charged into the reactor can be up to 5 feet.

The material of construction of the reactor is dependent on the type and kind of application. It varies from normal steel to stainless steel. The balls are special ceramics or metal materials.

The flow rate of material is dependent on the throughput and kind of reaction which will take place in the reactor. First plants utilizing the present invention have a throughput between 50 lb/h up to 2,200 lb/h. The throughput may be greater up to 6,000 lb/h in subsequent development.

Dependent on the dimensions of the reactor, the diameter of the balls varies between 1/10 inches up to 3 inches.

When the shaft is subdivided, for each shaft that is subdivided there is a tooth connection with a horizontal second engine shaft coming from outside from the reactor to operatively connect therewith. FIG. 3 shows three shafts (4, 41, 42).

In the embodiment using a hollow shaft, each subdivided shaft is connected to the next shaft with a fixed tube sealed by slop ring sealings. With this design it is possible to use the agitator shaft for the removal of reaction gases out of the reactor or to get inert gases inside.

All plates and the reactor itself can be hollow which means there are free spaces for hot gas. The reactor in this embodiment is comparable with a jacketed reactor vessel. By the use of metal balls an inductive heating effect is also possible.

The device of the invention has the great advantage that the functions of pyrolysis gas and pyrolysis oil can be adapted to the particular requirements in the individual ball charges by varying the temperatures. Moreover, the dwell times of gas and of solid can be varied independently of one another and other reactants can be introduced into the individual ball charges.

The device is also suitable for purifying soils contaminated with organic pollutants.

Further variations and modifications of the invention will be apparent to those skilled in the art from the foregoing and are intended to be encompassed by the claims appended hereto.

German priority application P 39 18 718.7 is relied on and incorporated by reference.

We claim:

1. A device for the thermal treatment of solid and sludge-like organic substances and of inorganic substances contaminated with organic substances, comprising an upright cylindrical reactor which is filled with ceramic or metal balls and is provided with an agitator for moving the balls in a radial and an axial direction, characterized in that the balls are distributed over several plates (2) arranged at intervals above each other which contains at least one perforation permeable to gases and fine solid particles.

2. The device according to claim 1 or 2, characterized in that the ratio between charge height of the balls and reactor diameter is between 0.1 and 2.

3. The device according to claim 1 or 2, characterized in that the agitator has a shaft (4) which is hollow.

4. The device according to claim 3, characterized in that the agitator shaft (4) is subdivided at least once into sections and that each such agitator section is separately driven.

* * * * *